United States Patent Office 3,422,117
Patented Jan. 14, 1969

3,422,117
5,8-METHANOBENZ(f)ISOINDOLINE-2-ACETIC ACID COMPOUNDS
Carleton W. Roberts, Midland, and Gale D. Travis, Shepherd, Mich., assignors to The Dow Chemical Company, Midland, Mich., a corporation of Delaware
No Drawing. Filed Dec. 23, 1966, Ser. No. 604,154
U.S. Cl. 260—326   3 Claims
Int. Cl. A61l 13/00

ABSTRACT OF THE DISCLOSURE

The present invention is directed to a 5,8-methanobenz(f)isoindoline-2-acetic acid compound of the following formula

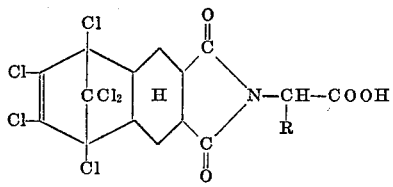

wherein R represents (p-hydroxybenzyl) or (2-(methylthio)ethyl). The products of the present invention are useful as agents to control the growth of plants, especially bacteria and fungi.

DETAILED DESCRIPTION OF THE INVENTION

As set forth hereinabove in the abstract, the present invention is directed to a 5,8-methanobenz(f)-isoindoline-2-acetic acid compound of the formula:

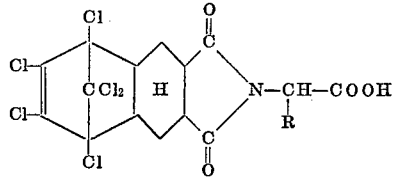

wherein R represents (p-hydroxybenzyl) or (2-(methylthio)ethyl). The products of the present invention are crystalline solids at room temperature. They are prepared by the reaction of 1,2,3,4,9,9-hexachloro-1,4,4a,5,6,7,7,8,8a - octahydro - 1,4 - methanonaphthalene - 6,7-dicarboylic anhydride (hereinafter the "anhydride")

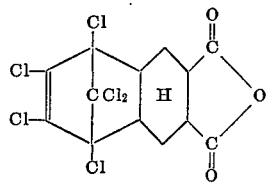

with an amine reactant of the formula

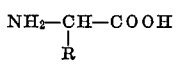

The reaction is carried out in the presence of an inert liquid as a reaction medium. The employment of such medium, or the identity of the inert liquid if employed, is not critical; however, the use of the medium provides for the dispersion and intimate contacting of the reactants, and is preferred. Representative inert liquids include hydrocarbons, such as benzene, hexane, and toluene; chlorinated hydrocarbons, such as dichloromethane; ethers; and N,N-disubstituted amides, such as dimethylformamide. Preferably, dimethylformamide is employed as inert liquid reaction medium.

The reaction of the anhydride and the amine reactant goes forward at temperatures over a wide range, for example, from 0° to 200° C. Generally, though, temperatures in the range of 30° to 160° C. are preferred. The reaction goes forward under atmospheric pressures of a wide range; however, no advantage ordinarily results from the use of subatmospheric or superatmospheric pressures, and, therefore, the preparation is ordinarily carried out at atmospheric pressures.

The amounts of the reactants to be employed are not critical, some of the desired product resulting when the reactants are employed in any amounts. The reactants are consumed in amounts which represent equimolecular proportions, and it is usually preferred to supply the anhydride reactant and the amine reactant in such amounts. The reaction results in the preparation of the desired product and of water as byproduct.

In carrying out the reaction, the reactants are contacted together, conveniently, by adding one reactant to the other reactant in inert liquid reaction medium. The reaction goes forward readily, and is generally complete upon the completion of the contacting of the reactants. However, it is sometimes preferred to permit the reaction mixture to stand for a period of time to assure completion of the reaction. Following the completion of the reaction, or when the reactants have been contacted for as long a period of time as it is desired, the product-containing reaction mixture can be employed for the useful purposes of the present invention. Alternatively, the product can be separated from the reaction mixture by conventional separation procedures, such as, for example, filtration, decantation, evaporation under subatmospheric pressure of the inert liquid reaction medium, and the like.

The separated product can be employed for the useful purposes of the present invention, or can be purified by conventional procedures before being so employed. Representative purification procedures include washing with an appropriate liquid which is a solvent for impurities but not for the product; recrystallization; and the like.

Each of the compounds to be employed as amine reactant in accordance with the teachings of the present invention comprises an asymmetric carbon atom. Either enantiomer can be employed as a starting material, but the racemic mixture can also be thus employed. Regardless of whether the amine starting material is employed as a racemic mixture or as one of its enantiomers, the reaction to prepare the corresponding product of the present invention goes forward readily, with no alteration in optical isomerism; and all of the resulting products of the present invention share the useful properties of the present invention.

The following examples illustrate the best mode now known for the present invention and will enable those skilled in the art to practice the same.

Example 1.—α - (p - hydroxybenzyl) - 5,6,7,8,10,10-hexachloro - 3a,4,4a,5,8,8a,9,9a - octahydro - 1,3 - dioxo - 5,8 - methanobenz(f)isoindoline - 2 - acetic acid 1,2,3,4,9,9 - hexachloro - 1,4,4a,5,6,7,8,8a - octahydro-1,4-methanonaphthalene-6,7-dicarboxylic anhydride (10.6 grams; 0.025 mole) and D,L-tyrosine (4.52 grams; 0.025 mole) were mixed with 60 milliliters of dimethylformamide. The resulting reaction mixture was then heated to reflux temperature, 151–152° C., and maintained at that temperature for two hours, subsequently cooled, poured into 500 milliliters of ice water and the resulting mixture held, with stirring, for 48 hours at room temperature. At the end of this time, the mixture was suction filtered to separate the desired α-(p-hydroxybenzyl)-5,6,7,8,10,10 - hexachloro - 3a,4,4a,5,8,8a,9,9a - octahydro-1,3-dioxo-5,8-methanobenz(f)-isoindoline - 2 - acetic acid product. The separated product was dried in an oven at 100° C. under subatmospheric pressure for 12 hours, and the dried product recrystallized from 50 milliliters of methyl alcohol. The product thus obtained melted at 258–260° C. Elemental analysis was conducted: Found, C, 44.40; H, 2.93; Cl, 36.10; N, 2.25. Calculated for $C_{22}H_{17}Cl_6NO_5$, C, 44.93; H, 2.92; Cl, 36.17; N, 2.38.

Example 2

1,2,3,4,9,9 - hexachloro - 1,4,4a,5,6,7,8,8a - octahydro-1,4-methanonaphthalene-6,7-dicarboximide (10.6 grams; 0.025 mole) and D,L-methionine (3.73 grams; 0.025 mole) were reacted together, in accordance with the procedures of Example 1, to obtain the expected product, α-(2 - (methylthio)ethyl) - 5,6,7,8,10,10 - hexachloro - 3a,4,4a,5,8,8a,9,9a - octahydro - 1,3 - dioxo - 5,8 - methanobenz(f) isoindoline-2-acetic acid, melting at 239.5–241° C.

The products of the present invention are useful as toxicants to control the growth of plants, especially bacteria and fungi. When one of the products is so employed, the unmodified substance can be utilized. However, the present invention also encompasses the utilization of the substance together with an adjuvant. For example, the substance can be dispersed on a finely divided solid and the resulting preparation employed as a dust. Also, a product of the present invention, or a composition comprising the same and a finely divided solid, can be dispersed in water with the aid of a wetting agent and the resulting aqueous suspension employed as a spray. In other procedures, a product of the present invention can be employed as the constituent of organic liquid compositions, oil-in-water or water-in-oil emulsions, or water dispersions, with or without the addition of a wetting, dispersing, or emulsifying agent.

In representative operations, a bacteriological culture medium containing 0.05 percent, by weight, of α-(p-hydroxybenzyl) - 5,6,7,8,10,10 - hexachloro - 3a,4,4a,5,8,8a, 9,9a - octahydro - 1,3 - dioxo - 5,8 - methanobenz(f)isoindoline-2-acetic acid gave complete inhibition of the growth of *Staphylococcus aureus*.

We claim:

1. Compound of the formula

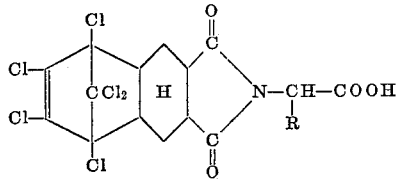

wherein R represents (p-hydroxybenzyl) or (2-(methylthio)ethyl).

2. The compound of claim 1 wherein R represents (p-hydroxybenzyl).

3. The compound of claim 1 wherein R represents (2-(methylthio)ethyl).

References Cited

UNITED STATES PATENTS 3,280,143    10/1966    Hayes _____ 260—326

NICHOLAS S. RIZZO, *Primary Examiner.*

J. A. NARCAVAGE, *Assistant Examiner.*

U.S. Cl. X.R.

260—346.3; 424—274